United States Patent Office 3,148,280
Patented Sept. 8, 1964

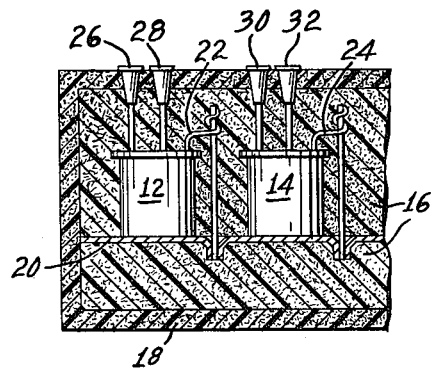
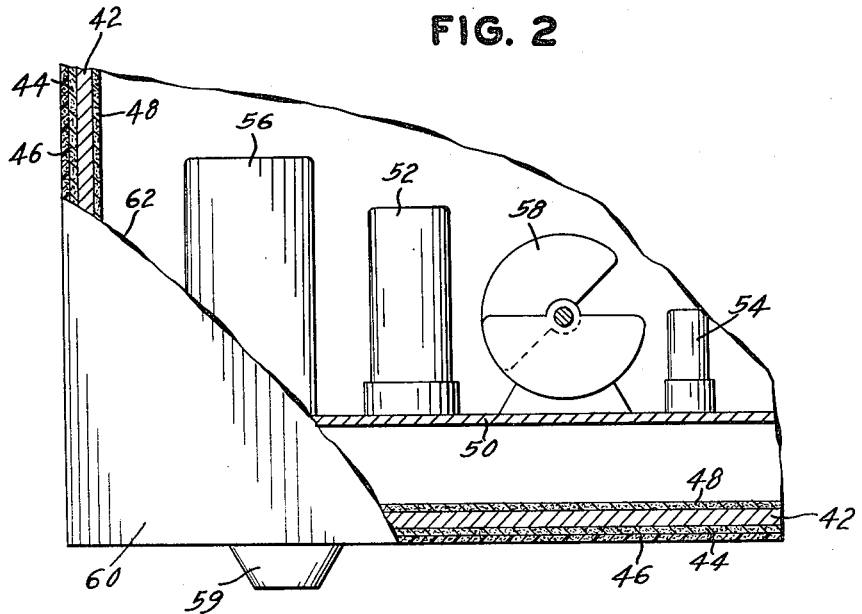

3,148,280
NUCLEAR RADIATION SHIELDS FOR
ELECTRONIC COMPONENTS
Eugene V. Kleber, North Hollywood, Calif., and Alfred R. Bobrowsky, Florham Park, N.J., assignors to Nuclear Corporation of America, Denville, N.J., a corporation of Delaware
Filed Aug. 28, 1959, Ser. No. 836,700
1 Claim. (Cl. 250—108)

This invention relates to nuclear shielding arrangements and more particularly to such arrangements for shielding against neutrons and gamma rays.

It is well known that nuclear radiations present severe hazards to human beings and that they may produce transient faults or permanent defects in electronic systems, particularly of the semi-conductor type. Nuclear radiations may also contaminate or damage other materials, to the extent that they are not suitable for their intended purpose.

Three of the most common forms of nuclear radiations are beta rays, gamma rays, and neutron particles. Beta rays act like electrons, and shielding from these rays therefore presents no serious problem. More specifically, they have little penetrating power, and nearly any arrangements which will protect against the transmission of gamma rays or neutrons will also block electrons or beta rays. Gamma rays are a form of electromagnetic radiation, and are of a wave nature similar to X-rays. The standard shielding techniques for gamma rays involve the use of sheets of heavy metals such as lead or steel. With respect to neutrons, they have no electrical charge and have a mass which is somewhat greater than that of a proton. Neutrons have substantial penetrating power and large tanks of water, for example, have been used in neutron shielding. For use with electronic equipment, or in the shielding of personnel carriers, the foregoing shielding techniques are not entirely satisfactory as they are too bulky and cumbersome.

Accordingly, principal objects of this invention include reducing the bulk and increasing the efficiency of shielding arrangements for human beings, or for electronic or other apparatus which is sensitive to high energy radiations.

In accordance with one aspect of the present invention, it is proposed to include powdered gadolinium oxide or another rare earth material having a high thermal neutron absorption cross-section in the organic potting compounds which are now extensively used in the electronic industry. An additional layer of organic compound including powdered dysprosium or europium oxide, having a high neutron cross-section for higher energy neutrons may also be provided. Alternatively, the last mentioned materials may be included in with the gadolinium oxide. With these arrangements, thermal neutrons (having low energy) are absorbed directly by the gadolinium; epithermal neutrons (having higher energies) are absorbed by the europium or dysprosium; and additional high energy neutrons are moderated or deflected by the hydrogen and carbon in the organic potting compound, and are then absorbed by the gadolinium. In this regard it is noted that gadolinium is known to have an extremely high neutron absorption cross-section of about 46,000 barns, as compared with less than 10 barns for many otherwise comparable elements.

The organic potting compound impregnated with neutron shielding material also serves to shield the incapsulated electronic component from gamma radiations, to a considerable extent. In this regard, gamma rays may be reduced in intensity by the rare earth material in the potting compound. Lead, preferably in the form of a powdered lead compound such as lead oxide or lead carbonate, may also be added to the potting compound to increase the shielding against gamma radiations.

In the cases of passenger vehicles or electronic systems mounted in conventional metallic cabinets, painted coatings on the inner or outer surfaces of the vehicles or cabinets may perform much the same function as the potting compounds. In the case of paints, the rare earth oxides or other radiation absorbing materials may be added instead of all or of a portion of the pigments, and the solidified organic vehicle serves the functions as mentioned above with respect to the organic potting compound. The coating including a gadolinium compound is preferably located on the inner surface of the cabinet, to better intercept neutrons which have been slowed down by the organic material in the outer layers of paint. The steel cabinet itself will also assist in shielding against gamma rays.

In accordance with a feature of my invention, therefore, a region to be protected from radiation is provided with a layer of solid organic material including dispersed particles containing gadolinium.

In accordance with a further feature of the invention, a region to be protected from radiation is provided with an inner layer of material containing material having a selectively high cross-section for thermal neutrons, and an outer layer of material having a selectively high cross-section for epithermal neutrons. In accordance with additional features of the invention, the thermal neutron absorbing materials may be gadolinium, samarium or europium, and the epithermal neutron absorbing materials may be dysprosium or erbium. Furthermore, the rare earth materials may be in the form of powdered oxides, and they may be dispersed in organic material, preferably a polymerized, or a polymerized resinous material.

These shielding arrangements have the advantage of providing increased shielding in a very small space, which is particularly useful for the protection of electronic equipment and the like. In the case of potted electronic equipment, in fact, the nuclear shielding may be provided without taking up any additional space, merely by the addition of the appropriate powdered rare earth oxide or oxides to the potting compound.

Other objects, features, and advantages of the invention will be apparent from a consideration of the following detailed description and the drawings, in which, FIGURE 1 is a fragmentary cross-sectional view of an electronic system including transistors embedded in potting compound, and FIGURE 2 shows a conventional electronic equipment cabinet coated with shielded material.

With reference to the drawings, FIGURE 1 is a cross-sectional view of a portion of an electronic system. Included as central components of FIGURE 1 are two transistors 12 and 14. The transistors 12 and 14 are incapsulated in potting compound 16. In addition, an outer coating 18 of plastic material is provided for additional protection as detailed below.

The particular arrangement shown in FIGURE 1 is similar to that set forth in J. A. Githens Patent 2,874,313, granted February 17, 1959. In this type of computer system, a ground plane including the conducting sheet 20 is provided, and the emitter electrodes 22 and 24 are advantageously secured to this grounded conducting sheet. The base and collector electrodes of transistors 12 and 14 are secured to the terminal connectors 26, 28, 30 and 32. External connections to other portions of the computer circuit may be completed by leads attached to these connectors. In the present case, however, the details of the computer system are not important; accordingly, reference will now be made to the nature of the incapsulating materials which provide shielding against nuclear radiations.

The potting compounds 16 and 18 of FIGURE 1 may be epoxy resins. This type of material is well known in the art and is described, for example, in Section 6, starting on page 35 of the book entitled "Technical Data on Plastics," published by the Manufacturing Chemists Association, Inc., 246 Woodward Building, Washington 5, D.C., in October of 1952. Other known organic materials may be employed. Organic materials are particularly suitable in view of the carbon and hydrogen atoms which are present. These lightweight elements provide a moderating effect which reduces the speed of incoming neutrons so that they may be readily absorbed by particles of gadolinium oxide which are embedded in the compound 16. The potting compound should be of organic material, and is preferably formed of a polymerized organic material. Furthermore, a resinous polymerized material is particularly to be preferred. Fine particles of material having a high thermal neutron cross-section are dispersed in the potting compound 16. The element gadolinium is to be preferred, and the particles may be in the form of gadolinium oxide. Other rare earth materials having suitably high thermal neutron cross-sections include samarium and europium.

The outer coating of organic potting material 18 may be of the same composition as the inner material 16. However, the particles suspended in the outer layer 18 are preferably of a material having a high cross-section for neutrons of somewhat higher energies, commonly designated epithermal neutrons. Suitable materials include the elements dysprosium and erbium. While these materials have a cross-section for thermal neutrons which is far less than that of gadolinium, they have a high capacity for absorbing neutrons of slightly higher energy levels.

With this arrangement, higher energy neutrons impinging on the outer surface 18 of the arrangement of FIGURE 1 will in part be absorbed by the materials suspended in the layer 18. Others of the high energy neutrons will have their energy reduced by collision with the carbon and hydrogen atoms included in the organic potting compound. These lower energy neutrons, designated thermal neutrons, may then be readily absorbed by the gadolinium suspended in the inner body of potting compound 16.

In addition to the rare earth oxides of different types suspended in the compounds 16 and 18, both of the potting compounds may include significant amounts of dispersed powdered lead. The powdered lead may suitably be in the form of lead oxide or lead carbonate. The presence of the lead compounds serves to attenuate to a significant degree incoming gamma radiations and the gamma radiations which occur when neutrons are absorbed by rare earth materials. In addition, the rare earth materials provide a significant effect in the reduction of gamma radiations. It may also be noted that the absorption of gamma radiations is broadly a function of atomic number at many energy ranges of interest. Accordingly, lead, tungsten and other of the high atomic number elements make a worthwhile addition to the rare earth neutron absorbing materials when gamma radiation shielding is required.

FIGURE 2 illustrates the application of the principles of the principal invention to a cabinet containing electronic equipment of a more conventional nature. The cabinet of FIGURE 2 includes the usual steel casing 42, two outer layers of paint 44 and 46, and an inner coating 48 which will be described in more detail below. The cabinet also includes the usual metallic supporting member or shelf 50 located an inch or so above the floor of the cabinet. In the customary manner, interconnections and small elements, i.e., resistors and condensers (not shown), are located in the space below the metal shelf 50. Major electronic components such as the vacuum tubes 52 and 54, the electrolytic condenser assembly 56, and the variable capacitor 58 are mounted on the shelf 50. A conventional rubber base pad 59 is secured to the bottom of the cabinet. The front cover 60 of the cabinet is shown broken away at 62 to reveal the inner construction of the cabinet.

Shielding is provided in accordance with the present invention by replacing at least part of the pigments in the painted coatings 44, 46 and 48 by materials having suitable radiation absorption qualities. Thus, for example, the outer layer 46 may include powdered material having a high epithermal neutron cross-section. As discussed above, these elements may suitably include dysprosium or erbium oxide. The painted layer 44 may suitably include particles such as lead oxide or gadolinium oxide to absorb gamma and neutron radiations, respectively. On the inside of the steel casing 42 an additional coating 48 of a paint containing particulate material having a high thermal neutron cross-section may be employed. As discussed above, this material having a high thermal cross-section is preferably gadolinium oxide and may include samarium or europium, or gadolinium in other forms than the oxide. In this regard, gadolinium may also be included in a paint in the form of gadolinium titanate.

In addition to the shielding factors noted above with respect to the arrangement of FIGURE 1, the steel cabinet 42 provides additional shielding against gamma radiations. While iron is not as good as the more dense element lead for shielding against gamma radiations, it will be effective to further attenuate these gamma radiations to some extent.

The layers of material may be applied by painting or spraying paint or the organic potting compound, or a slurry containing the radiation absorbing material on to the appropriate surface or object to be protected. With regard to paints, it is noted in passing that the vehicles of most paints polymerize upon hardening and form organic material which serves the same function as the potting compounds. In cases where particularly high levels of neutron radiation are to be encountered, gadolinium oxide may be flame sprayed directly on a roughened metallic surface which is to form the neutron shield.

In the drawings and the foregoing description, the principles of the invention are disclosed in connection with the protection of electronic equipment. However, it is to be noted that the techniques disclosed in connection with FIGURE 2 may be advantageously applied to personnel carriers such as army tanks or naval vessels. Similarly, the principles of the invention are applicable to the shielding of many other radiation sensitive things.

The amount of neutron or other radiation absorbing material required may be readily determined in terms of the incident flux, the level required within the container, and the cross-section of the material. Thus, for example, one representative situation could involve an incident flux of $10^6$ or one million neutrons per second per square centimeter, and the need to reduce this level to a level of $4.8 \times 10^2$ or 480 neutrons per second per square centimeter, which has been proposed as a safe level for human beings. Using gadolinum having a cross-section of 46,000 barns, and using the established value of a "barn" as equal to $10^{-24}$ square centimeters per nucleus, it may readily be calculated that .04 gram of gadolinium per square centimeter is required. The formula for this determination is as follows:

$$\frac{I}{I_0} = e^{-Sx} \qquad (1)$$

where $I_0$ is the intensity of the incident neutron beam, $I$ is the intensity of the neutron beam beyond the shield, $e$ is the base of natural logarithms, S is the macroscopic cross section (cm.$^{-1}$), and $x$ is the thickness in centimeters.

$$S = \frac{sAd}{M} \quad (2)$$

where $s$ is the microscopic cross section (cm.$^2$), A is Avogadro's number, $d$ is the density (gm./cm.$^3$), and M is the atomic weight (the units for $A/M$ being gm.$^{-1}$).

Combining (1) and (2), the following equation is obtained:

$$\log \frac{I_0}{I} = \frac{sA}{M}(xd) \quad (3)$$

where $(xd)$ is the weight of material per square centimeter of surace area required to attenuate from a flux of $I_0$ to a flux of I.

To work out the example mentioned above, the values of $s$ and M for gadolinium, as well as the input and the desired output fluxes, must be known. For gadolinium, $$s = 46,000 \times 10^{-24} \quad (4)$$

$$M = 157 \quad (5)$$

As stated in the ilustrative problem:

$$I_0 = 10^6 \text{ neutrons/cm.}^2\text{/sec. (thermal)} \quad (6)$$

$$I = 4.8 \times 10^2 \text{ neutrons/cm.}^2\text{/sec.} \quad (7)$$

Now, substituting in Equation 3 the answer may be worked out as follows:

$$xd = \frac{\log\left(\frac{I_0}{I}M\right)}{sA} = 0.043 \text{ gm. gadolinium/cm}^2.$$

This confirms the answer of about .04 gm. of gadolinium per square centimeter of surface area required to provide the necessary shielding, as set forth above.

In general, the praticles containing gadolinium or the other neutron absorbing material form 10 to 30 percent of the solid content of the coating; this range may be extended down to one percent, and up to 100 percent, in the case of flame sprayed gadolinum oxide for example.

In summary, the present invention in one aspect contemplates the use of (1) an outer moderator layer to slow down fast neutrons, (2) selected rare earths (dysprosium and erbium) for epithermal neutron absorption, (3) selected rare earths (preferably gadolinum, also samarium and europium) for thermal neutron absorption, and (4) material of high atomic weight such as lead for incident or "capture" gamma radiations. Each of the four functions may be accomplished by the use of a separate layer. Alternatively, powdered compounds including the indicated materials may be contained in potting compound or another form of carrier, as described above.

It is to be understood that the above described arrangements are illustrative of the application of the principles of the invention. Numerous other arrangements, such as the application of the coatings to vehicles, air raid shelters or the like, may be devised by those skilled in the art without departing from the spirit and scope of the invention.

What is claimed is:

A shielded electronic component assembly including in combination a support, an electrical component carried by said support, an inner layer comprising an element having a high thermal neutron adsorption cross section dispersed in an organic potting compound substantially surrounding said component and an outer layer comprising an element having a high epithermal neutron absorption cross section dispersed in an organic potting compound substantially surrounding said component.

References Cited in the file of this patent

UNITED STATES PATENTS

| | | |
|---|---|---|
| 2,769,915 | Tittle | Nov. 6, 1956 |
| 2,769,916 | Tittle | Nov. 6, 1956 |
| 2,769,918 | Tittle | Nov. 6, 1956 |
| 2,807,727 | Fermi et al. | Sept. 24, 1957 |
| 2,811,487 | Stanton | Oct. 29, 1957 |
| 2,853,624 | Wigner et al. | Sept. 23, 1958 |
| 2,920,204 | Youmans | Jan. 5, 1960 |
| 2,937,110 | John | May 17, 1960 |
| 2,952,775 | Guinn | Sept. 13, 1960 |
| 2,961,341 | Long | Nov. 22, 1960 |
| 2,968,726 | Bersin et al. | Jan. 17, 1961 |
| 3,006,785 | Canegallo | Oct. 31, 1961 |

FOREIGN PATENTS

| | | |
|---|---|---|
| 27,357 | Great Britain | Oct. 12, 1905 |
| 703,153 | Great Britain | Jan. 27, 1954 |

OTHER REFERENCES

Levey Abstract, published in the Official Gazette, vol. 665, December 23, 1952, pp. 1314–15.